(12) United States Patent
Gupta et al.

(10) Patent No.: US 11,801,454 B2
(45) Date of Patent: Oct. 31, 2023

(54) LIQUID-LIQUID EXTRACTION OF VACUUM RESID-CONTAINING FLUID

(71) Applicant: ExxonMobil Technology and Engineering Company, Annandale, NJ (US)

(72) Inventors: Himanshu Gupta, Clinton, NJ (US); James W. Gleeson, Magnolia, TX (US); Travis M. DeShazo, Annandale, NJ (US); Khizera Tariq, Manassas, VA (US)

(73) Assignee: ExxonMobil Technology and Engineering Company, Annandale, NJ (US)

( * ) Notice: Subject to any disclaimer, the term of this patent is extended or adjusted under 35 U.S.C. 154(b) by 5 days.

(21) Appl. No.: 17/830,971

(22) Filed: Jun. 2, 2022

(65) Prior Publication Data
US 2022/0410031 A1    Dec. 29, 2022

Related U.S. Application Data

(60) Provisional application No. 63/202,582, filed on Jun. 17, 2021.

(51) Int. Cl.
| | |
|---|---|
| *B01D 11/04* | (2006.01) |
| *C10G 47/02* | (2006.01) |
| *C10G 11/02* | (2006.01) |

(52) U.S. Cl.
CPC .......... *B01D 11/0492* (2013.01); *C10G 11/02* (2013.01); *C10G 47/02* (2013.01); *C10G 2300/1081* (2013.01); *C10G 2300/1088* (2013.01)

(58) Field of Classification Search
CPC . B01D 11/049; B01D 11/043; B01D 11/0434; B01D 11/0438; B01D 11/0488; C10G 11/02; C10G 47/02; C10G 2300/108; C10G 2300/1088
See application file for complete search history.

(56) References Cited

U.S. PATENT DOCUMENTS

2006/0260981 A1* 11/2006 Gosling ................ C10G 69/14
422/139

* cited by examiner

*Primary Examiner* — Thuan D Dang
(74) *Attorney, Agent, or Firm* — Vorys, Sater, Seymour and Pease LLP (57) ABSTRACT

Methods comprising contacting a residue comprising paraffinic, olefinic, and aromatic hydrocarbons with a polar solvent under conditions effective to extract at least a portion of the aromatic hydrocarbons from the residue into the polar solvent, thereby generating: an extract phase comprising the portion of aromatic hydrocarbons and the polar solvent; and, a raffinate phase comprising a majority of the paraffinic and olefinic hydrocarbons.

15 Claims, 2 Drawing Sheets

LIQUID-LIQUID EXTRACTION OF VACUUM RESID-CONTAINING FLUID

FIELD OF THE INVENTION

The present disclosure relates to methods for processing a vacuum residue obtained from the distillation of crude oil.

BACKGROUND OF THE INVENTION

Crude oil is made up of a mixture of hydrocarbons that may be distilled to separate this crude oil into broad categories of its component hydrocarbons, or "fractions." Different fractions boil at different temperatures and thus may be recovered as fractions characterized by a boiling point or boiling point range. The heaviest fraction is a residual fraction (or "residue") that does not convert into vapor for collection even at the highest distillation temperature. When the distillation is carried out at atmospheric pressure, it is known as atmospheric residue, and typically comprises hydrocarbons that boil above about 750° F. To allow further separation of the hydrocarbons within the atmospheric residue, the atmospheric residue may be distilled under vacuum to effectively decrease the boiling point of hydrocarbons remaining in the atmospheric residue. However, even vacuum distillation of the atmospheric residue generates a residual fraction that is not converted into vapor for collection. This vacuum residue comprises the largest and most complex hydrocarbons that boil above about 1000° F. In particular, vacuum residues typically comprise paraffinic hydrocarbons, olefinic hydrocarbons, naphthenic hydrocarbons, aromatic hydrocarbons, asphaltenes, metals, sulfur, and nitrogen. The vacuum residue is regarded as low quality and is typically used as fuel oil or in asphalt due to the incompatibility of its components with other conversion processes. For example, catalytic cracking generally requires feed of a certain quality as common cracking catalysts are easily deactivated by metals, sulfur, nitrogen, and aromatic hydrocarbons. While vacuum residues do contain valuable hydrocarbons (e.g., paraffins, olefins), they are generally considered inaccessible due to the economic burden of isolating them from undesirable aromatics, asphaltenes, sulfur, nitrogen, and other metals. Therefore, there is a need in the industry to explore and develop new methods to gain access to the valuable hydrocarbons in residue fractions in an economically feasible manner, thereby increasing the overall value of the fraction.

SUMMARY OF THE INVENTION

Methods comprising contacting a residue comprising paraffinic, olefinic, and aromatic hydrocarbons with a polar solvent under conditions effective to extract at least a portion of the aromatic hydrocarbons from the residue into the polar solvent, thereby generating: an extract phase comprising the portion of aromatic hydrocarbons and the polar solvent; and, a raffinate phase comprising a majority of the paraffinic and olefinic hydrocarbons.

Other methods comprise contacting a residue comprising paraffinic, olefinic, and aromatic hydrocarbons with a polar solvent under conditions effective to extract at least a portion of the aromatic hydrocarbons from the residue into the polar solvent, thereby generating: an extract phase comprising the portion of aromatic hydrocarbons and the polar solvent; and, a raffinate phase comprising a majority of the paraffinic and olefinic hydrocarbons. And then upgrading the raffinate phase via cracking, preferably fluid catalytic cracking.

Still other methods comprise contacting a residue comprising paraffinic, olefinic, and aromatic hydrocarbons with a polar solvent under conditions effective to extract at least a portion of the aromatic hydrocarbons from the residue into the polar solvent, thereby generating: an extract phase comprising the portion of aromatic hydrocarbons and the polar solvent; and, a raffinate phase comprising a majority of the paraffinic and olefinic hydrocarbons. And then dewaxing the raffinate phase.

Still other methods comprise contacting a residue comprising paraffinic, olefinic, and aromatic hydrocarbons with a polar solvent under conditions effective to extract at least a portion of the aromatic hydrocarbons from the residue into the polar solvent, thereby generating: an extract phase comprising the portion of aromatic hydrocarbons and the polar solvent; and, a raffinate phase comprising a majority of the paraffinic and olefinic hydrocarbons. And then dewaxing the raffinate phase and then upgrading the raffinate phase via cracking, preferably fluid catalytic cracking.

BRIEF DESCRIPTION OF THE DRAWINGS

The following figures are included to illustrate certain aspects of the present disclosure, and should not be viewed as exclusive embodiments. The subject matter disclosed is capable of considerable modifications, alterations, combinations, and equivalents in form and function, as will occur to one having ordinary skill in the art and having the benefit of this disclosure.

DETAILED DESCRIPTION OF THE INVENTION

The present disclosure relates to methods for processing a residue obtained from the distillation of crude oil to recover useful hydrocarbon products.

As used herein, "vacuum distillation" refers to the distillation of a composition under a pressure that is less than atmospheric pressure, thereby reducing the boiling point of the liquid being distilled. Pressures suitable for use in vacuum distillation are typically in a range of about 50 mm Hg to about 100 mm Hg (about 6 KPa to about 13 KPa), but can vary depending on the specific properties of the composition being distilled.

As used herein, "atmospheric distillation" refers to the distillation of a composition at atmospheric pressure, or about 760 mm Hg (about 101 KPa).

As used herein, and unless otherwise specified, the term "hydrocarbon" refers to a class of compounds containing hydrogen bound to carbon, and encompasses (i) saturated hydrocarbon compounds, (ii) unsaturated hydrocarbon compounds, and (iii) mixtures of hydrocarbon compounds (saturated and/or unsaturated), including mixtures of hydrocarbon compounds having different numbers of carbon atoms. Hydrocarbons may be one or more of linear, branched, cyclic, acyclic, saturated, unsaturated, aliphatic, or aromatic.

As used herein, and unless otherwise specified, the term "paraffin," alternatively referred to as "alkane," and grammatical derivatives thereof, refers to a saturated hydrocarbon chain of one to about one hundred carbon atoms in length, such as, but not limited to methane, ethane, propane and butane. A paraffin may be straight-chain, cyclic or branched-chain. "Paraffin" is intended to embrace all structural isomeric forms of paraffins. The term "acyclic paraffin" refers to straight-chain or branched-chain paraffins. The term "isoparaffin" refers to branched-chain paraffins and the term "n-paraffin" or "normal paraffin" refers to straight-chain paraffins.

As used herein, and unless otherwise specified, the terms "olefin" and "olefinic hydrocarbon," alternatively referred to as "alkene," refer to one or more unsaturated hydrocarbon compound containing at least one carbon atom directly bound to another carbon atom by a double bond. In other words, an olefin is a compound that contains at least one pair of carbon atoms, where the first and second carbon atoms of the pair are directly linked by a double bond. An olefin may be straight chain or branched chain, or contain naphthene rings. "Olefin" is intended to embrace all structural isomeric forms of olefins.

As used herein, and unless otherwise specified, the terms "aromatics" and "aromatic hydrocarbon" mean unsaturated cyclic hydrocarbons having a delocalized conjugated $\pi$ system and having from six to sixty carbon atoms (e.g., aromatic $C_6$-$C_{60}$ hydrocarbon). Examples of suitable aromatics include, but are not limited to benzene, toluene, xylenes, mesitylene, ethylbenzenes, cumene, naphthalene, methylnaphthalene, dimethylnaphthalenes, ethylnaphthalenes, acenaphthalene, anthracene, phenanthrene, tetraphene, naphthacene, benzanthracenes, fluoranthrene, pyrene, chrysene, triphenylene, and the like, and combinations thereof. Additionally, an aromatic may comprise one or more heteroatoms. Examples of heteroatoms include, but are not limited to, nitrogen, oxygen, and/or sulfur. Aromatics with one or more heteroatom include, but are not limited to thiophene, benzothiophene, oxazole, thiazole and the like, and combinations thereof. An aromatic may comprise monocyclic, bicyclic, tricyclic, and/or polycyclic rings (in any embodiment, at least monocyclic rings, only monocyclic and bicyclic rings, or only monocyclic rings) and may be fused rings.

The term "conditions effective to" refers to conditions to which a residue may be subjected that results in a raffinate phase having a desired yield and/or aromatic content. Conditions may include temperature, pressure, reaction time, and the like, which are conditions known to those of ordinary skill in the art with benefit of this disclosure.

As used herein, the term "asphaltenic material" or "asphaltenes" refers to carbon-based multi-ring aromatic materials.

As discussed above, a vacuum residue may be produced as a residual non-boiling fraction of a vacuum distillation of a residual non-boiling fraction of an atmospheric distillation of crude oil. Due to the size and complexity of the hydrocarbons contained therein, vacuum residues (also atmospheric residues) tend to be highly viscous in nature. Further, being a non-boiling fraction, vacuum and atmospheric residues contain hydrocarbons with a high boiling point (e.g., aromatic hydrocarbons) and other non-boilable components such as metals and asphaltenic material. Impurities such as asphaltenes and metals, along with the high boiling point of the hydrocarbons contained within the vacuum residue, essentially preclude catalytically upgrading due to the fact that a majority of catalysts are sensitive to metals and/or high temperature coking and then can undergo rapid deactivation.

As will be described further herein, one method for enabling catalytic upgrading of a residue comprising paraffinic, olefinic, and/or aromatic hydrocarbons involves contacting the residue with a polar solvent under conditions effective to extract at least a portion of the aromatic hydrocarbons from the residue into the polar solvent, thereby generating an extract phase and a raffinate phase, wherein the raffinate phase contains a majority of the desirable paraffinic and olefinic hydrocarbons within the residue and wherein the extract phase comprises more of the metals and heavy aromatics.

Thus, the raffinate phase has a lower aromatic hydrocarbon content, and it may further have a lower metal content, and/or asphaltenic content than the vacuum residue from which it was formed and therefore is more compatible with catalytic upgrading process, for example, catalytic cracking. Therefore, optionally, the raffinate phase may be conveyed as a feed or part of a feed for a catalytic cracking reactor, for example, a fluid catalytic cracker.

Figure 1:
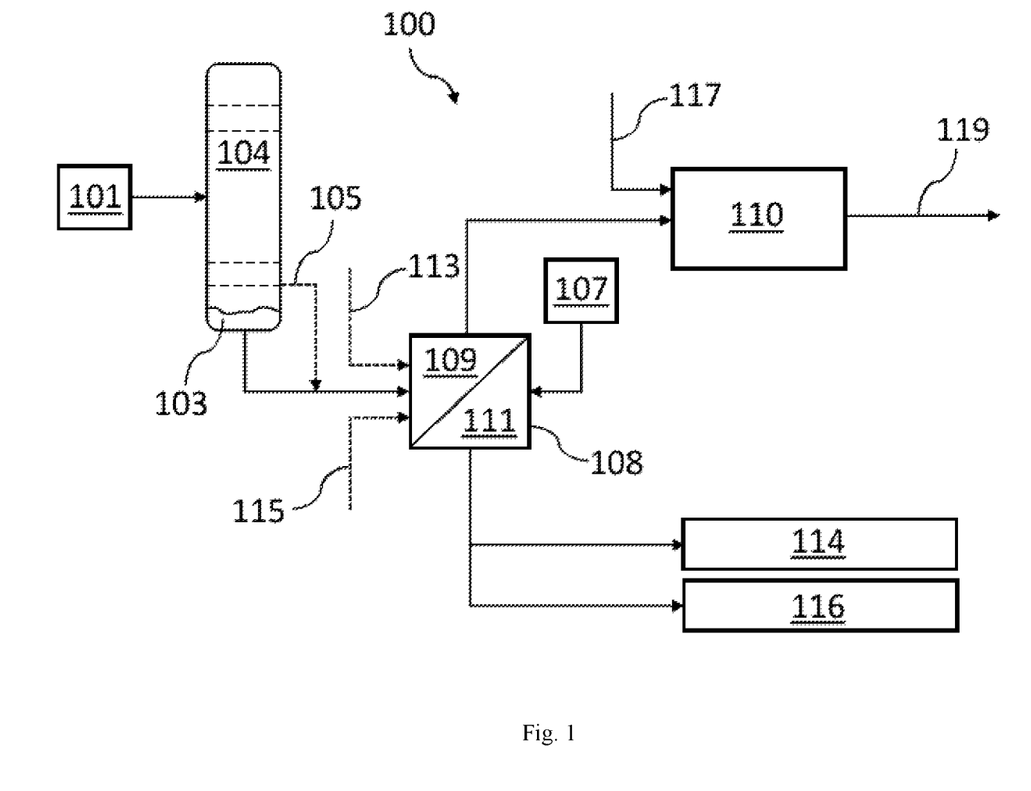
FIG. 1 illustrates a schematic representation of a process using solvent extraction of a vacuum residue.

FIG. 1 illustrates a schematic of a process that may be used to upgrade a residue. First residue 101, which may be an atmospheric residue, obtained from distilling crude oil (or desalted crude oil) may be distilled in distillation tower 104 to produce second residue 103. Preferably, distillation tower 104 is a vacuum tower and second residue 103 is a vacuum residue. Second residue 103 is then conveyed to a downstream solvent extraction stage 108 where second residue 103 is contacted with a polar solvent 107 under conditions effective to extract aromatic hydrocarbons in second residue 103 into the polar solvent and removed as extract phase 111. What remains following extraction is raffinate phase 109, which comprises a majority of the paraffinic and olefinic hydrocarbons that were present in second residue 103.

Raffinate phase 109 is separated from extract phase 111 and conveyed to an upgrading stage 110. In various embodiments, upgrading stage 110 comprises contacting raffinate phase 109 with a catalyst. For example, the upgrading stage 110 may comprise catalytic cracking or, more preferably, fluid catalytic cracking; thus producing product 119. Where upgrading stage 110 comprises catalytic cracking, product 119 may comprise gasoline, vacuum gasoil, and/or lighter hydrocarbons.

The extract phase 111 is a heavy extract contains the heavy asphaltenes and metals and may be conveyed for blending into a fuel oil 116 or to a coker 114.

The process described in FIG. 1 has many optional envisaged variations. For example, optionally, second residue 103 may be diluted, for example, with a lighter fraction 105 from the distillation tower 104 (e.g. an overflash fraction). Additionally or alternatively, second residue 103 may be combines with one or more additional vacuum residues 113 or low-sulfur atmospheric residues 115. In yet another optional variation, raffinate phase 109 may be combined with another raffinate phase or vacuum gasoil 117 before being processed in upgrading stage 110.

In some cases it may be desirable to subject the raffinate phase 109 to dewaxing before upgrading stage 110. Dewaxing before upgrading may, among other things, protect any catalyst using in upgrading. In some cases it may be desirable to subject second residue 103 to deasphalting prior to sending second residue 103 to solvent extraction stage 108.

Figure 2:
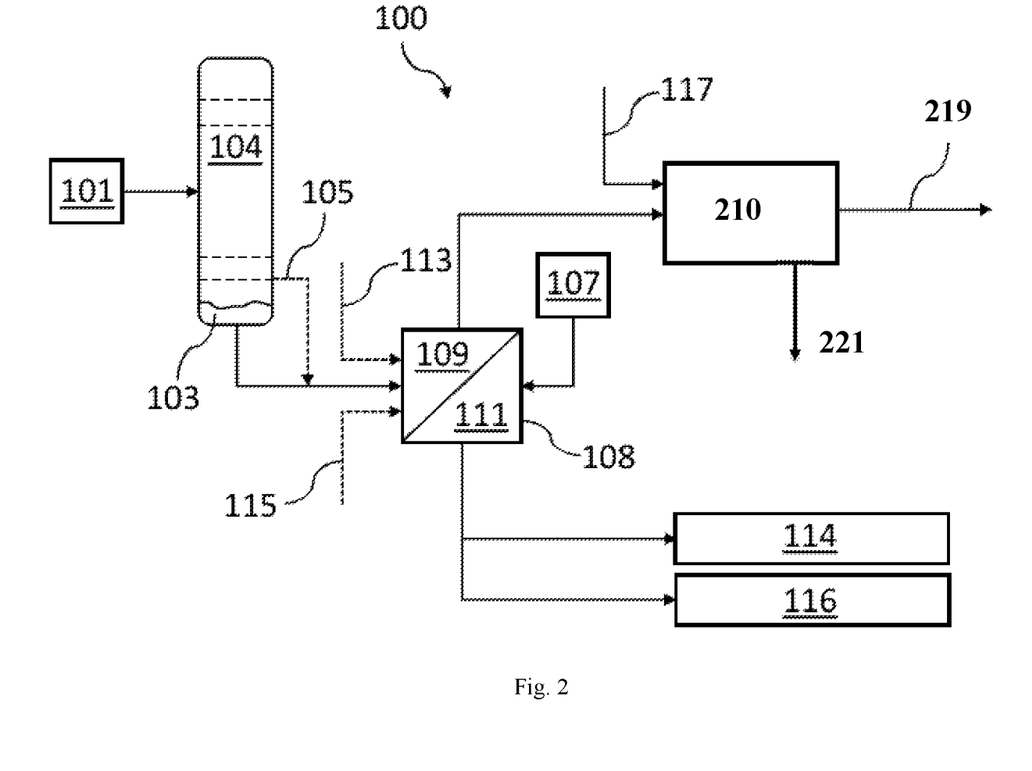
FIG. 2 illustrates another representation of a process using solvent extraction of a vacuum residue.

FIG. 2 illustrates a schematic of another process that may be used to upgrade a residue. Where the same reference numbers are used to describe FIG. 1 and FIG. 2, they refer to the same elements. illustrates a schematic of a process that may be used to upgrade a residue. Where FIG. 2 deviates from FIG. 1 is the processing of the raffinate after it leaves solvent extraction stage 108. Just as in FIG. 1, in FIG. 2 the raffinate phase 109 comprises a majority of the paraffinic and olefinic hydrocarbons that were present in second residue 103.

In FIG. 2, rather than proceeding to upgrading stage 110, the raffinate 109 is sent to solvent dewaxing 210. In various embodiments, solvent dewaxing 210 comprises subjecting the raffinate to the basic steps of crystallization, filtration, and solvent recovery. Catalytic dewaxing comprising contacting raffinate phase 109 with a catalyst to convert unwanted wax components. One of skill in the art will recognize the various types of dewaxing known on the art and will be able to select an appropriate dewaxing method. Once the raffinate has been dewaxed, the primary product will be bright stock 119 while the remainder will be wax stream 221.

The extract phase 111 is a heavy extract contains the heavy asphaltenes and metals and may be conveyed for blending into a fuel oil 116 or to a coker 114.

The process described in FIG. 1 has many optional envisaged variations. For example, optionally, second residue 103 may be diluted, for example, with a lighter fraction 105 from the distillation tower 104 (e.g. an overflash fraction). Additionally or alternatively, second residue 103 may be combines with one or more additional vacuum residues 113 or low-sulfur atmospheric residues 115. In yet another optional variation, raffinate phase 109 may be combined with another raffinate phase or vacuum gasoil 117 before being processed in upgrading stage 110. In some cases it may be desirable to subject second residue 103 to deasphalting prior to sending second residue 103 to solvent extraction stage 108.

The raffinate, once dewaxed, may be suitable for use as a bright stock base oil. The term bright stock is well known in the industry and refers to lube base oils of high viscosity produced by atmospheric distillation and/or vacuum distillation that have been subject non-polar extraction and then may be dewaxed or further upgraded. A bright stock may be a blending material for lubricating oils or a product itself.

Generally, distillation of crude oil, desalted crude oil, and/or an atmospheric residue may be carried out according to any conventional process using any conventional distillation column suitable and known in to one of ordinary skill in the art. The crude oil may be petroleum extracted from geological formations below the earth's surface or may be derived from organic mass. For example, crude shale oil may be obtained through pyrolysis, hydrogenation, or thermal dissolution of oil shale rock fragments may be used as the crude oil. As used herein, shale oil refers to liquid hydrocarbons produced from kerogen and/or bitumen trapped in oil shale.

One of skill in the art will understand the general properties of a residue. Residues (which may be a vacuum residue or an atmospheric residue) may comprise paraffinic hydrocarbons, olefinic hydrocarbons, aromatic hydrocarbons, sulfur, nitrogen, asphaltenic material, and various metals such as, but not limited to, calcium, iron, sodium, nickel, and vanadium. Generally an atmospheric residue may be characterized by a $T_{95}$ boiling point of at least about 520° F., such as at least about 600° F., at least about 700° F., or at least about 750° F. Similarly, a vacuum residue may be characterized by a $T_{95}$ boiling point of at least about 1000° F., such as at least about 1050° F., at least about 1100° F., or at least about 1200° F. A $T_{95}$ boiling point refers to the temperature by which 95% of the weight of the material boils.

As noted above, a residue may be diluted prior to extraction, for example with other, lighter vacuum residue feed (such as 113) or low-sulfur atmospheric residue feed (such as 115). Such dilution may, in various embodiments, improve flowability and processability of the residues. Examples of suitable diluents include, but are not limited to, light vacuum gas oil, naphtha, diesel range distillate, lube extract/s, n-decane (and like alkanes), and any blend thereof. A residue may be combined with a diluent at a diluent-to-residue ratio of 0 (e.g., not diluted) to about 3:1, more preferably 0 to about 0.4:1.

During extraction, a residue may be contacted with a polar solvent under conditions to effectively extract aromatic hydrocarbons in the residue into the polar solvent ("extract phase") while generating a raffinate phase comprising a majority of the paraffinic and olefinic hydrocarbons that were in the residue. Suitable polar solvents include any that form immiscible phases with a residue at a temperature of less than about 150° C. Specific examples include, but are not limited to, furfural, n-methyl-2-pyrrolidone (NMP), phenol, sulfur dioxide, nitrobenzene, bis(chloroethyl)ether, propane, benzene, and any blend thereof. Effective conditions include atmospheric pressure and a temperature of about 70° C. to the limit of miscibility of the polar solvent and residue. In various embodiments, an upper temperature limit may be about 120° C., depending on the solvent. For example, a temperature of about 80° C. to about 110° C. may be particularly useful when using furfural while a temperature of about 90° C. to about 120° C. may be particularly useful when using NMP. Extraction may be carried out at any suitable pressure, for example, atmospheric pressure.

The residue (including any optional diluent) may be contacted with a polar solvent at a solvent-to-residue (including any optional diluent) ratio of about 0.1:1 to about 10:1, such as about 2:1 to about 8:1, more preferably about 2:1 to about 5:1, and more preferably from 1:1 to 3:1. The contacting may be carried out for any period of time as desired. Likewise, the raffinate phase may be separated from the extract phase be contacted one or more times with the same or a different polar solvent to enhance or further the extraction of aromatic hydrocarbons into the polar solvent. Extraction may be performed in any conventional extraction apparatus such as, but not limited to, a rotating disc contactor column, a pulsed column, a centrifugal contactor, a sieve tray column, a randomly-packed column, or a structured packed column.

Under effective conditions, a raffinate may comprise a majority, such as at least about 50 wt. %, such as at least about 60 wt. % or at least about 70 wt. % of the paraffinic and olefinic hydrocarbons in the residue from which the raffinate was formed. A raffinate phase may additionally have a lower aromatic content, a lower asphaltenic material content (e.g., lower CCR—Conradson Carbon Residue), a lower metal content, a lower sulfur content, a lower nickel content, or any combination thereof. Under effective conditions, a raffinate phase may have an aromatic hydrocarbon content that is at least about 10% lower, such as about 15% lower, or about 20% lower than the aromatic hydrocarbon content of the residue from which it was formed. In various embodiments, the methods disclosed herein may produce a raffinate phase having a CCR that is at least 30% lower than the CCR of the residue from which it was formed. In particular, a raffinate phase may have a CCR of about 3% or less. In the same or other various embodiments, the methods disclosed herein may produce a raffinate phase having a calcium concentration that is at least about 60% lower than the residue from which it was formed. In the same or other various embodiments, the methods disclosed herein may produce a raffinate phase having a calcium concentration of about 1 ppm or less.

The raffinate phase comprising a majority of the paraffinic and olefinic hydrocarbons present in the residue from which the raffinate was formed may be upgraded using a process that may have otherwise been incompatible with the residue prior to polar solvent extraction. For example, a raffinate phase may be used as feed in catalytic cracking, for example, fluid catalytic cracking. Optionally, a raffinate phase may be processed prior to being used as a feed for catalytic cracking. For example, a raffinate phase may be hydrotreated to remove residual sulfur and/or nitrogen.

The extract phase comprising the polar solvent and at least a portion of the aromatic hydrocarbons that were initially in the residue may be used, for example, by blending into fuel oil, processing in a coker, or using in asphalt. Advantageously, by employing the methods disclosed herein, fewer valuable hydrocarbons (paraffins/olefins) are routed to low valued products, but instead, upgraded for economic gain as part of the raffinate phase.

The following methods were used to characterize various properties of the residue, raffinate phase, and extract phase: Boiling point ranges and distillation data were measured according to ASTM D2887-19a using a simulated distillation system. In simulated distillation, individual hydrocarbon components are separated in the order of their boiling points, such that laboratory-scale physical distillation procedures may be simulated. The separation may be accomplished with a gas chromatograph equipped with a chromatography column coated with a nonpolar (hydrocarbon-like) stationary phase, an oven and injector which can be temperature programmed. A flame ionization detector (FID) is used for detection and measurement of the hydrocarbon analyte. The analysis provides a quantitative percent mass yield as a function of boiling point of the hydrocarbon components of the sample being analyzed. The chromatographic elution times of the hydrocarbon components are calibrated to the atmospheric equivalent boiling point (AEBP) of the individual n-alkane as described in a method from the ASTM by using n-alkane (n-paraffin) reference material. In ASTM D2887, the n-alkane calibration reference covers the boiling range 55° C.-538° C. (100° F.-1000° F.) which covers the n-alkanes with a chain length of about $C_5$-$C_{44}$.

API gravity and density were measured according to ASTM D4052-18a. Refractive index was measured according to ASTM D1218-12(2016). Kinematic viscosity was measured according to ASTM D445-19a. Sulfur content was measured according to ASTM D 2622. Nitrogen content was measured according to ASTM D4629-17. Conradson Carbon Residue (CCR) was measured according to ASTM D4530-15. Calcium, iron, sodium, nickel, and vanadium were all measured by inductively coupled plasma atomic emission spectroscopy. Aromatic hydrocarbons with 2+ rings, and aromatic hydrocarbons with 3+ rings were measured by ultraviolet spectroscopy.

As is apparent from the foregoing general description and the specific embodiments, while forms of the disclosure have been illustrated and described, various modifications may be made without departing from the spirit and scope of the disclosure. Accordingly, it is not intended that the disclosure be limited thereby. For example, the compositions described herein may be free of any component, or composition not expressly recited or disclosed herein. Any method may lack any step not recited or disclosed herein. Likewise, the term "comprising" is considered synonymous with the term "including." Whenever a method, composition, element or group of elements is preceded with the transitional phrase "comprising," it is understood that we also contemplate the same composition or group of elements with transitional phrases "consisting essentially of," "consisting of," "selected from the group of consisting of," or "is" preceding the recitation of the composition, element, or elements and vice versa.

Unless otherwise indicated, all numbers expressing quantities of ingredients, properties such as molecular weight, reaction conditions, and so forth used in the present specification and associated claims are to be understood as being modified in all instances by the term "about." Accordingly, unless indicated to the contrary, the numerical parameters set forth in the following specification and attached claims are approximations that may vary depending upon the desired properties sought to be obtained by the embodiments of the present invention. At the very least, and not as an attempt to limit the application of the doctrine of equivalents to the scope of the claim, each numerical parameter should at least be construed in light of the number of reported significant digits and by applying ordinary rounding techniques.

Whenever a numerical range with a lower limit and an upper limit is disclosed, any number and any included range falling within the range is specifically disclosed. In particular, every range of values (of the form, "from about a to about b," or, equivalently, "from approximately a to b," or, equivalently, "from approximately a-b") disclosed herein is to be understood to set forth every number and range encompassed within the broader range of values. Also, the terms in the claims have their plain, ordinary meaning unless otherwise explicitly and clearly defined by the patentee. Moreover, the indefinite articles "a" or "an," as used in the claims, are defined herein to mean one or more than one of the element that it introduces.

One or more illustrative embodiments are presented herein. Not all features of a physical implementation are described or shown in this application for the sake of clarity. It is understood that in the development of a physical embodiment of the present disclosure, numerous implementation-specific decisions must be made to achieve the developer's goals, such as compliance with system-related, business-related, government-related and other constraints, which vary by implementation and from time to time. While a developer's efforts might be time-consuming, such efforts would be, nevertheless, a routine undertaking for one of ordinary skill in the art and having benefit of this disclosure.

EXAMPLE EMBODIMENTS

Embodiment A: A method comprising contacting a residue comprising paraffinic, olefinic, and aromatic hydrocarbons with a polar solvent under conditions effective to extract at least a portion of the aromatic hydrocarbons from the residue into the polar solvent, thereby generating: an extract phase comprising the portion of aromatic hydrocarbons and the polar solvent; and, a raffinate phase comprising a majority of the paraffinic and olefinic hydrocarbons.

Embodiment B: A method comprising contacting a residue comprising paraffinic, olefinic, and aromatic hydrocarbons with a polar solvent under conditions effective to extract at least a portion of the aromatic hydrocarbons from the residue into the polar solvent, thereby generating: an extract phase comprising the portion of aromatic hydrocarbons and the polar solvent; and, a raffinate phase comprising a majority of the paraffinic and olefinic hydrocarbons; and then cracking the raffinate phase.

Embodiment C: A method comprising contacting a residue comprising paraffinic, olefinic, and aromatic hydrocarbons with a polar solvent under conditions effective to extract at least a portion of the aromatic hydrocarbons from the residue into the polar solvent, thereby generating: an extract phase comprising the portion of aromatic hydrocarbons and the polar solvent; and, a raffinate phase comprising a majority of the paraffinic and olefinic hydrocarbons; and then dewaxing the raffinate phase.

Embodiment D: A method comprising contacting a residue comprising paraffinic, olefinic, and aromatic hydrocarbons with a polar solvent under conditions effective to extract at least a portion of the aromatic hydrocarbons from the residue into the polar solvent, thereby generating: an extract phase comprising the portion of aromatic hydrocarbons and the polar solvent; and, a raffinate phase comprising a majority of the paraffinic and olefinic hydrocarbons; and then dewaxing the raffinate phase and then cracking the dewaxed raffinate phase.

Embodiments A, B, C, and D can be used in combination with the following elements:

Element 1: wherein the cracking is fluid catalytic cracking.

Element 2: wherein the residue is contacted with the polar solvent at a temperature of about 70° C. to about 120° C.

Element 3: wherein the residue is contacted with the polar solvent in a rotating disc contactor column, a pulsed column, a centrifugal contactor, a sieve tray column, a randomly-packed column, or a structured packed column.

Element 4: wherein the residue is a material remaining from the processing of hydrocarbons and wherein the hydrocarbons may comprise crude oil, crude shale oil, oil derived from organic mass, or a combination thereof.

Element 5: wherein the residue and raffinate phase are each characterized by a CCR and the CCR of the raffinate phase is at least about 30% less than the CCR of the vacuum residue.

Element 6: wherein the residue and raffinate phase are each characterized by a CCR and wherein the CCR of the raffinate phase is less than about 3 wt. %.

Element 7: wherein the residue is characterized by a $T_{95}$ of at least about 1000° F.

Element 8: wherein the concentration of aromatic hydrocarbons in the raffinate phase is at least 15% lower than the concentration of aromatic hydrocarbons in the residue.

Element 9: wherein the residue and raffinate phase further comprise a metal selected from the group consisting of calcium, iron, sodium, nickel, vanadium, and any combination thereof.

Element 10: wherein the residue and raffinate phase further comprise calcium and wherein the concentration of calcium in the raffinate phase is at least about 50% less than the concentration of calcium in the vacuum residue.

Element 11: wherein the raffinate phase comprises at least about 70 wt. % of the paraffinic and olefinic hydrocarbons present in the residue.

Element 12: wherein the polar solvent is selected from the group consisting of furfural, n-methylpyrrolidone, phenol, sulfur dioxide, nitrobenzene, bis(chloroethyl) ether, propane, benzene, and any mixture thereof.

Element 13: the residue is contacted with the polar solvent at a solvent-to-residue v/v ratio of about 1:1 to about 3:1.

Element 14: wherein the residue and raffinate phase each comprise sulfur and the concentration of sulfur in the raffinate phase is less than the concentration of sulfur in the residue.

Examples of combinations of embodiments and elements include: Embodiment A, B, C, or D with Element 1; Embodiment A, B, C, or D with Elements 1, 2, and 4; Embodiment A, B, C, or D with Elements 1 and 6; Embodiment A, B, C, or D with Elements 8 and 9; Embodiment A, B, C, or D with Elements 1 and 11; Embodiment A, B, C, or D with Elements 12 and 13; Embodiment A, B, C, or D with Elements 1 and 14;

To facilitate a better understanding of the embodiments of the present invention, the following examples of preferred or representative embodiments are given. In no way should the following examples be read to limit, or to define, the scope of the invention.

EXAMPLES

Example 1

Vacuum residues ("VR") were blended with a polar solvent. Tables 1-4 below indicate specific solvent and temperatures used and the resulting properties of the vacuum residue, raffinate phase, extract phase, and if calculated, an estimated yield (based on the identified property). The yields were calculated by assuming the property partitioned from the feed between the products in proportion to their yields.

TABLE 1

Extraction with furfural (8:1 solvent:residue)

| Component/Property | Vacuum Residue | Raffinate | Extract | Estimated Yield |
|---|---|---|---|---|
| Sulfur (wt. %) | 0.688 | 0.513 | — | 134 |
| Basic Nitrogen (ppm) | 331 | 231 | — | — |
| CCR (wt. %) | 4.68 | 2.91 | 17.4 | 88 |
| Density (API Gravity) | 22.1 | 24.9 | — | — |
| Density at 15° C. (g/cm$^3$) | 0.9176 | 0.9047 | — | — |
| Refractive Index | 1.4915 | 1.4825 | 1.574 | 90 |
| Kinematic Viscosity at 100° C. (mm$^2$/s) | 66 | 56.778 | — | — |
| Total Aromatics (mmol/kg) | 608.96 | 553.54 | 1508.45 | 94 |
| Aromatics with 2+ rings (mmol/kg) | 434.79 | 339.76 | 1487.25 | 92 |
| Aromatics with 3+ rings (mmol/kg) | 256.6 | 189.14 | 944.17 | 91 |
| Polar aromatics (mmol/kg) | 77.22 | 70.01 | 201.5 | 95 |
| Calcium (ppm) | 3.12 | 1.17 | <0.32 | — |
| Iron (ppm) | 4.26 | 2.29 | 16.4 | — |
| Sodium (ppm) | <2.39 | 2.94 | 42.2 | — |
| Nickel (ppm) | 1.69 | 1.4 | 3.2 | — |
| Vanadium (ppm) | 13 | 9.07 | 27 | 78 |
| Nickel + Vanadium/4 (ppm) | 14.69 | 10.47 | 30.2 | — |

TABLE 2

Extraction with NMP (5:1 solvent:residue)

| Component/Property | Vacuum Residue | Raffinate | Extract | Estimated Yield |
|---|---|---|---|---|
| Sulfur (wt. %) | 0.688 | 0.382 | — | — |
| Basic Nitrogen (ppm) | 331 | 176 | — | — |
| CCR (wt. %) | 4.68 | 1.79 | 12.3 | 73 |
| Density (API Gravity) | 22.1 | 26.5 | — | — |
| Density at 15° C. (g/cm$^3$) | 0.9176 | 0.8954 | — | — |
| Refractive Index | 1.4915 | 1.476 | 1.542 | 77 |
| Kinematic Viscosity at 100° C. (mm$^2$/s) | 66 | 50.075 | — | — |
| Total Aromatics (mmol/kg) | 608.96 | 400.96 | 1374.52 | 79 |
| Aromatics with 2+ rings (mmol/kg) | 434.79 | 207.27 | 1238.96 | 78 |
| Aromatics with 3+ rings (mmol/kg) | 256.6 | 110.47 | 766.67 | 78 |
| Polar aromatics (mmol/kg) | 77.22 | 48.67 | 182.76 | 79 |
| Calcium (ppm) | 3.12 | 0.1 | 0.42 | — |
| Iron (ppm) | 4.26 | 0.48 | 2.09 | — |
| Sodium (ppm) | <2.39 | <0.58 | 4.39 | — |
| Nickel (ppm) | 1.69 | 0.86 | 2.49 | — |
| Vanadium (ppm) | 13 | 5.64 | 23.7 | 59 |
| Nickel + vanadium/4 (ppm) | 14.69 | 6.5 | 26.19 | — |

TABLE 3

Extraction with furfural (3:1 solvent:residue), Column Temp = 117° C.

| Component/Property | Vacuum Residue | Raffinate | Extract |
|---|---|---|---|
| Sulfur (wt. %) | 1.01 | 0.40 | 1.41 |
| Nitrogen (ppm) | 2300 | 890 | 5830 |
| CCR (wt. %) | 9.2 | 3.6 | 15.1 |
| Aromatics (estimate, wt. %) | — | 66 | — |
| Nickel (ppm) | 13.6 | 5.8 | 18.8 |
| Vanadium (ppm) | 22.4 | 6.4 | 32.4 |
| Kinematic Viscosity at 100° C. (mm$^2$/s) | — | 94.4 | — |
| Kinematic Viscosity at 135° C. (mm$^2$/s) | 47.4 | 30.8 | 104.3 |
| Simdis ($T_{10}$/$T_{50}$/$T_{90}$ (° C.)) | 542/ 626/730 | 562/ 642/733 | 536/ 616/721 |
| Simdis (50 wt % off (° C.)) | 626 | 642 | 616 |
| Simdis (50 wt % vs vacuum resid) | — | 16 | — |
| Yield (vol. %) | — | ~50% | — |

TABLE 4

Extraction with NMP (5:1 solvent:residue), Column Temp = 90° C.

| Component/Property | Vacuum Residue | Raffinate |
|---|---|---|
| Sulfur (wt. %) | 0.69 | 0.38 |
| Nitrogen (ppm) | — | 572 |
| Aromatics (estimate, wt. %) | 63 | 73 |
| CCR (wt. %) | 4.7 | 1.8 |
| Nickel (ppm) | 1.7 | 0.9 |
| Vanadium (ppm) | 13 | 5.6 |
| Kinematic Viscosity at 100° C. (mm$^2$/s) | 66.0 | 50.1 |
| Simdis ($T_{10}$/$T_{50}$/$T_{90}$ (° C.)) | 528/ 604/709 | 535/ 613/711 |
| Simdis (50 wt % off (° C.)) | 604 | 613 |
| Simdis (50 wt % vs vacuum resid) | — | 9 |
| Yield (vol. %) | — | 73% |

TABLE 5

Typical Ranges for Deasphalted Oil (Extraction with NMP (2:1 to 3.5:1 solvent:residue); Column Temp = 100° C.

| Component/Property | Vacuum Residue | De-asphalted Oil | Raffinate of DAO |
|---|---|---|---|
| Sulfur (wt. %) | 2.6-5.4 | 1.4-1.9 | 0.7-0.9 |
| Nitrogen (ppm) | 3000-6000 | 700-1700 | 300-400 |
| CCR (wt. %) | 13-22 | 1.7-3.0 | 0.6-1.0 |
| Aromatics (estimate, wt. %) | — | 66 | 45 |
| Nickel (ppm) | 30-75 | 18.8 | 0.6-0.8 |
| Vanadium (ppm) | 100-320 | 1 | — |
| Kinematic Viscosity at 100° C. (mm$^2$/s) | 6-1600 | 36-42 | 30-34 |
| Simdis (50 wt % off (° C.)) | 645 | 602 | 612 |
| Simdis (50 wt % vs vacuum resid) | — | −43 | −33 |
| Yield (vol. %) | — | 30%-50% | ~25% |

A vacuum residue (VR) may be processed in a single extraction step to produce a raffinate that appears to exhibit similar sulfur, nitrogen, and aromatic content when compared to a typical deasphalted oil (DAO) raffinate. Advantageously, however, VR raffinates may be produced at a higher yield (~50 vol. % and 73 vol. %) as compared to DAO raffinate (~25 vol. %). Additionally, VR raffinates appear to have a higher boiling point than the DAO raffinates.

Example 2

A viscous residue may be diluted with a light vacuum gasoil (LVGO) for easier processing. A viscous VR was diluted with a LVGO in a ratio of 3:1 VR:LVGO, which was, in turn, blended with furfural at a final ratio of 64:21:15 VR:VGO:furfural. This example demonstrated that two phases were formed and successfully separated visually in a manner similar to that of successful separations.

Example 3

Vacuum Residue 1 was extracted using the polar solvent NMP and Vacuum Residue 2 was extracted using polar solvent furfural. The physical properties are shown below in Tables 6 and 7:

TABLE 6

Vacuum Residue 1 Properties

| | Vacuum Residue 1 | Raffinate | Extract |
|---|---|---|---|
| Yield from extraction | | 73 vol % | |
| Compositions | | | |
| Sulfur (wt %) | 0.69 | 0.38 | |
| Nitrogen (ppm) | | 572 | |
| Total aromatics (UV, mmol/kg) | 609 | 401 | 1375 |
| 2+ aromatics (UV, mmol/kg) | 435 | 207.27 | 1239 |
| 2+ aromatics (UV, mmol/kg) | 257 | 110 | 767 |
| Carbon Residue, Metals | | | |
| Micro Carbon Residue (wt %) | 4.7 | 1.8 | 12.3 |
| Nickel (ppm) | 1.7 | 0.9 | 2.49 |
| Vanadium (ppm) | 13 | 5.6 | 23.7 |
| Sodium (ppm) | <2.4 | <0.6 | 4.4 |
| Calcium (ppm) | 3.1 | 0.1 | 0.42 |
| Iron (ppm) | 4.3 | 0.48 | 2.1 |
| Kinematic Vicosity (KV)/Boiling Point (BP) | | | |
| Refractive Index | | 1.476 | 1.542 |
| KV @ 100° C. (cST) | | 50.1 | 155 (est.) |
| KV @ 40° C. (cST) | | 157 | |
| Viscosity Index | | 113 | 62 (est.) |
| BP $T_{10}/T_{50}/T_{95}$ (simulated) | 528/604/709 | 535/613/711 | |

TABLE 7

Vacuum Residue 2 Properties

| | Vacuum Residue 1 | Raffinate | Extract |
|---|---|---|---|
| Yield from extraction | | 50 vol % (est.) | |
| Compositions | | | |
| Sulfur (wt %) | 1.01 | 0.4 | 1.41 |
| Nitrogen (ppm) | 2300 | 880 | 5830 |
| Total aromatics (UV, mmol/kg) | 932 | 566 | 1429 |
| 2+ aromatics (UV, mmol/kg) | | 331 | 1274 |
| 2+ aromatics (UV, mmol/kg) | 458 | 180 | 786 |
| Carbon Residue, Metals | | | |
| Micro Carbon Residue (wt %) | 9.2 | 3.6 | 15.1 |
| Nickel (ppm) | 13.6 | 5.8 | 18.8 |
| Vanadium (ppm) | 22.4 | 6.4 | 32.4 |
| Sodium (ppm) | 58.1 | 10.0 | 49.8 |
| Calcium (ppm) | 20.5 | 5.2 | 12.4 |
| Iron (ppm) | 92.7 | 29.1 | 62 |
| Kinematic Vicosity (KV)/Boiling Point (BP) | | | |
| Refractive Index | 1.5181 | 1.4844 | |
| KV @ 100° C. (cST) | | 94.4 | 606 (calculated from KCV at 150 and 135° C.) |
| KV @ 40° C. (cST) | | 103 | 63 |
| Viscosity Index | 91 | 103 | 63 |
| BP $T_{10}/T_{50}/T_{95}$ (simulated) | 542/626/730 | 562/642/733 | 536/616/721 |

When Vacuum Residue 1 was dewaxed the volume % yield went from 73% to 62% and when Vacuum Residue 2 was dewaxed the volume % yield went from approximately 50% to 43%.

Table 8 compares the raffinates from Vacuum Residue 1 and Vacuum Residue 2 against typical bright stock.

TABLE 8

| | Vacuum Distillate 1 | | Vacuum Distillate 2 | | Typical Bright Stock | Raffinate of deasphalted oil |
|---|---|---|---|---|---|---|
| | Residue | Raffinate | Residue | Raffinate | Residue | |
| Yield (vol %) | | 73 | | 50% (est.) | | 25% (est) |
| Sulfur (wt %) | 0.69 | 0.38 | 1.01 | 0.4 | 2.6-5.4 | 0.7-0.9 |
| Nitrogen (ppm) | | 572 | 2300 | 880 | 3000-6000 | 300-400 |
| Total Aromatics | 609 | 401 | 932 | 566 | 1200-1350 | 550 |
| 3+ aromatics | 257 | 110 | 458 | 180 | 700-800 | 92 |
| Micro Carbon Residue | 4.7 | 1.8 | 9.2 | 3.6 | 13-22 | 0.6-1.0 |
| Nickel | 1.7 | 0.9 | 13.6 | 5.8 | 30-75 | |
| Vanadium | 13 | 5.6 | 22.4 | 6.4 | 100-320 | |
| KV at 100° C. | 66.0 | 50.1 | | 94.4 | 600-1600 | 30-34 |
| Dewaxed KV at 100° C. | | 62 est. | | 108 est. | | 34-40 |

Following solvent extraction and before any further processing the physical properties of the extracted residue raffinates were compared to produce known in the market. The results are shown below in Table 9.

TABLE 9

| | Yield (in vol %) | Kinematic Viscosity at 100° C. (in cSt) | Kinematic Viscosity at 40° C. (in cSt) | Viscosity Index |
|---|---|---|---|---|
| Residue extracted with NMP | 62 | 62 | 1300 | 110 |
| Residue extracted with furfural | 43 | 108 | 3189 | 100 |
| ERGON ® | | 43.1 | 971 | 80-85 |
| BS quoted by ERGON ® | | 18.7 | 422 | 15 |
| NYNAS ® BSN 800 | | 24.3 | 800 | −26 |
| NYNAS ®T4000 | | 40 | 4445 | −250 |

In the Table above, Ergon refers to Ergon, Inc. headquartered in Jackson, Mississippi 39215-1639. Similarly, Nynas refers to Nynas headquartered in Stockholm Sweden.

Therefore, the present disclosure is well adapted to attain the ends and advantages mentioned as well as those that are inherent therein. The particular embodiments disclosed above are illustrative only, as the present disclosure may be modified and practiced in different but equivalent manners apparent to one having ordinary skill in the art and having the benefit of the teachings herein. Furthermore, no limitations are intended to the details of construction or design herein shown, other than as described in the claims below. It is therefore evident that the particular illustrative embodiments disclosed above may be altered, combined, or modified and all such variations are considered within the scope and spirit of the present disclosure. The embodiments illustratively disclosed herein suitably may be practiced in the absence of any element that is not specifically disclosed herein and/or any optional element disclosed herein.

The invention claimed is:

1. A method comprising: contacting a residue comprising paraffinic, olefinic, and aromatic hydrocarbons with a polar solvent under conditions effective to extract at least a portion of the aromatic hydrocarbons from the residue into the polar solvent, thereby generating:
   an extract phase comprising the portion of aromatic hydrocarbons and the polar solvent and a raffinate phase comprising a majority of the paraffinic and olefinic hydrocarbons; and
   converting the raffinate phase by fluid catalytic cracking to produce a cracked product; wherein the residue is a material remaining from the processing of hydrocarbons and wherein the hydrocarbons may comprise crude oil, crude shale oil, oil derived from organic mass, or a combination thereof.

2. The method of claim 1, wherein the raffinate phase is dewaxed before it is upgraded.

3. The method of claim 1, wherein the residue is contacted with the polar solvent at a temperature of about 70° C. to about 120° C.

4. The method of claim 1, wherein the residue is contacted with the polar solvent in a rotating disc contactor column, a pulsed column, a centrifugal contactor, a sieve tray column, a randomly-packed column, or a structured packed column.

5. The method of claim 1, wherein the residue and raffinate phase are each characterized by a Conradson Carbon Residue ("CCR") and the CCR of the raffinate phase is at least about 30% less than the CCR of the residue.

6. The method of claim 5, wherein the CCR of the raffinate phase is less than about 3 wt. %.

7. The method of claim 1, wherein the residue is characterized by a $T_{95}$ of at least about 1000° F.

8. The method of claim 1, wherein the concentration of aromatic hydrocarbons in the raffinate phase is at least 15% lower than the concentration of aromatic hydrocarbons in the residue.

9. The method of claim 1, wherein the residue and raffinate phase further comprise a metal selected from the group consisting of calcium, iron, sodium, nickel, vanadium, and any combination thereof.

10. The method of claim 9, wherein the concentration of calcium in the raffinate phase is at least about 50% less than the concentration of calcium in the residue.

11. The method of claim 1, wherein the raffinate phase comprises at least about 70 wt. % of the paraffinic and olefinic hydrocarbons present in the residue.

12. The method of claim 1, wherein the polar solvent is selected from the group consisting of furfural, n-methylpyrrolidone, phenol, sulfur dioxide, nitrobenzene, bis(chloroethyl) ether, and any mixture thereof.

13. The method of claim 1, wherein the residue is contacted with the polar solvent at a solvent-to-residue v/v ratio of about 1:1 to about 3:1.

14. The method of claim 1, wherein the residue and raffinate phase each comprise sulfur and the concentration of sulfur in the raffinate phase is less than the concentration of sulfur in the residue.

15. The method of claim 1, wherein one or more of, light vacuum gasoil, naphtha, diesel range distillate, lube extract, and an overflash is added to the residue before contacting the residue with the polar solvent.

* * * * *